Oct. 30, 1923.
P. CHINZERIS
1,472,745
SELF LOCKING SEAL FOR GAS AND OTHER METERS
Filed Aug. 10, 1921
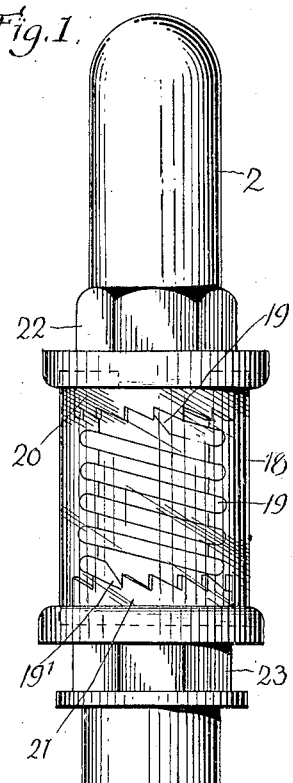
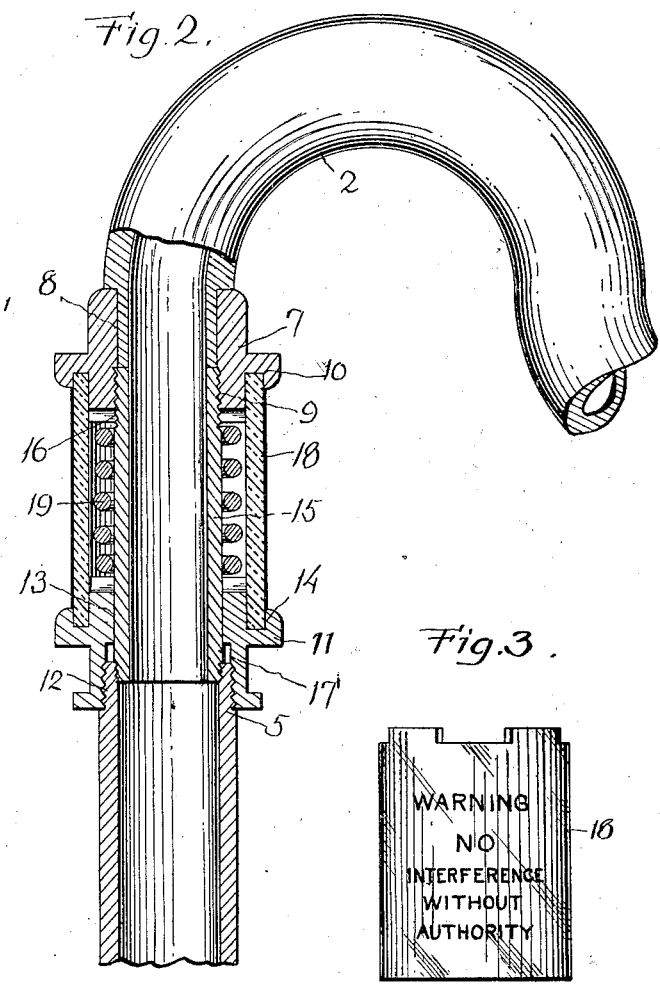
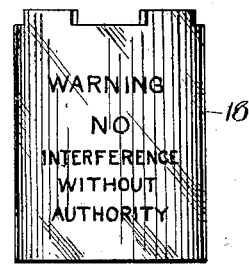
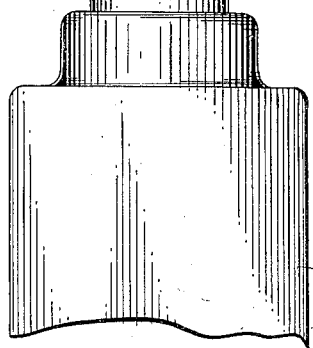
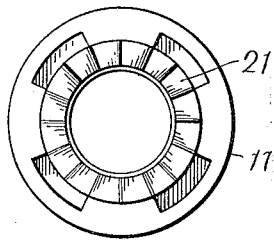
Inventor
Peter Chinzeris,
By O.D. Anderson
his Attorneys Patented Oct. 30, 1923.

1,472,745

UNITED STATES PATENT OFFICE.

PETER CHINZERIS, OF ATLANTA, GEORGIA.

SELF-LOCKING SEAL FOR GAS AND OTHER METERS.

Application filed August 10, 1921. Serial No. 491,210.

*To all whom it may concern:*

Be it known that I, PETER CHINZERIS, a citizen of the United States, resident of Atlanta, in the county of Fulton and State of Georgia, have made a certain new and useful invention in Self-Locking Seals for Gas and Other Meters; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention.

Figure 2 is a central vertical section of the same.

Figure 3 is a detail side view of the glass cylinder.

Figure 4 is a detail plan view of the lower metal member.

The invention has relation to gas and other meters, and has for its object the provision of means for preventing the same from being tampered with by one desiring to obtain the metered gas or other material or substance without registration or with a lessened registration of the meter.

The invention consists in the novel construction and combinations of parts, as hereinafter set forth.

In the accompanying drawings illustrating the invention, the numeral 2 designates a pipe adapted to convey gas to the consumer, being the delivery pipe from the main, and which may have a gooseneck or other curved portion therein. It is customary for the meter, in the case of a gas meter, 4, to have an inlet nipple 5, connecting with the service pipe from the main by means of a lead pipe, the latter having a union internally threaded and engaging the externally threaded nipple, this union being substituted by the device of applicant.

This device consists of an upper metal member 7, engaging a reduced portion 8 of the pipe 2, and secured thereto in any suitable manner, as for instance by a split ring. The member 7 has at its lower end an internal thread 9 and an annular groove 10; a lower metal member 11 having a lower end provided with an internal thread 12 engaging the thread of the nipple 5, and an upper portion provided with a contracted aperture 13, and an annular groove 14; a metal pipe section 15 having at its upper end an external thread 16 engaging the thread of the upper member and at its lower end provided with an annular collar 17 resting upon the nipple 5 and located between the same and the upper portion of the member 11, said pipe section closely engaging the contracted aperture of said member; a frangible or breakable cylinder or member 18 engaging at the upper and lower ends thereof respectively with the annular grooves of the upper and lower members aforesaid, and a spiral spring 19 surrounding the pipe section 15 and located between the same and the frangible cylinder 18, and having at its upper and lower ends each a toothed portion 19' engaging respectively with oppositely ratchet toothed portions 20 and 21 of the upper and lower members.

A wrench being applied to the wrench seat 22 or 23 of either the upper or the lower member in an effort to disconnect the meter from the service pipe, rotation of either member will cause the spiral spring to be unwound or moved reversely of the windings thereof and thereby expanded circumferentially, and inasmuch as said spring is a comparatively close fit in the frangible or glass cylinder 18, the latter is at once fractured or broken, so that when the gas man comes around in the regular course to read the meter at the end of the month he will at once see that it has been tampered with.

The glass cylinder 18 may bear a suitable warning inscription or notice as to unauthorized interference therewith.

I claim:

1. A theft guard for gas and other meters consisting in a connection between the service pipe and the meter, having as a part thereof a frangible member, an expansible member, and a member engaging and expanding the expansible member in disconnecting the meter.

2. A theft guard for gas and other meters, consisting in a connection between the service pipe and the meter, including upper and lower ratchet toothed members, an expansible coiled spring having toothed upper and lower ends engaging the ratchet teeth of said members, and a frangible member.

In testimony whereof I affix my signature in presence of two witnesses.

PETER CHINZERIS.

Witnesses:
  C. B. DAUN,
  M. E. HOLLINGSWORTH.